United States Patent [19]
de Coulon et al.

[11] Patent Number: 6,043,644
[45] Date of Patent: Mar. 28, 2000

[54] DEVICE FOR DETECTING POSITION AND MOVEMENT BY USING MAGNETIC FIELD VARIATION

[75] Inventors: Yves de Coulon, Thielle-Wavre; Johan Wilhelm Bergqvist, Bôle; Hervé de Lambilly, Neuchâtel, all of Switzerland

[73] Assignee: Cesm Centre Suisse d'Electronique et de Microtechnique SA - Recherche et Developpement, Neuchatel, Switzerland

[21] Appl. No.: 08/843,774

[22] Filed: Apr. 22, 1997

[30] Foreign Application Priority Data

Apr. 29, 1996 [CH] Switzerland ............................ 1071/96

[51] Int. Cl.[7] ................................ G01B 7/30; G01P 3/48; G01P 13/00; G01D 5/22

[52] U.S. Cl. .................... 324/207.18; 324/164; 324/165; 324/166; 324/173; 324/207.25; 336/79

[58] Field of Search ..................................... 324/163–166, 324/173, 174, 207.17–207.19, 207.25, 239–243; 336/75, 77, 79; 341/15

[56] References Cited

U.S. PATENT DOCUMENTS

| | | | |
|---|---|---|---|
| 2,754,678 | 7/1956 | Stinger ................................ | 324/173 X |
| 3,281,825 | 10/1966 | Corl et al. ........................... | 324/173 X |
| 3,440,532 | 4/1969 | Chung ................................... | 324/164 |
| 4,405,896 | 9/1983 | Akita .................................... | 324/173 |
| 4,417,208 | 11/1983 | Hachtel et al. ....................... | 324/164 |
| 4,507,638 | 3/1985 | Brosh . | |
| 4,737,698 | 4/1988 | McMullin et al. ................... | 336/79 X |
| 4,810,966 | 3/1989 | Schmall ............................... | 324/207.17 |
| 4,820,961 | 4/1989 | McMullin ............................ | 336/79 X |
| 5,300,882 | 4/1994 | Barros ................................. | 324/207.17 |
| 5,434,504 | 7/1995 | Hollis et al. ........................ | 324/207.17 |

FOREIGN PATENT DOCUMENTS 530090  3/1993  European Pat. Off. .

OTHER PUBLICATIONS

Soviet Patent Abstracts, Derwent Publications, Ltd., London, GB; AN 8–013259, XP002020511 & SU,A, 1 315 792 (N–W Correspondence), Jun. 7, 1987.

Patent Abstracts of Japan, vol. 8, No. 242 (P–311), Nov. 7, 1984, & JP,A,59 116552 (Aishin Seiki), Jul. 5, 1984.

Equizable, Antonio L; Hall–effect tachometer senses speed, direction of rotation, *Electronics* vol. 53, No. 19 (Aug. 28, 1980) pp. 176–177.

*Primary Examiner*—Gerard Strecker
*Attorney, Agent, or Firm*—Sughrue, Mion, Zinn, Macpeak & Seas, PLLC

[57] ABSTRACT

The present invention concerns the domain of inductive contactless sensors, allowing the position and/or the movement of a target sensitive to a magnetic field to be detected. The invention provides a miniature sensor comprising at least a primary coil generating an alternating magnetic field and at least two secondary coils for picked up such field, the coils being planar. The amplitude of the signal picked up by each coil is when the target passes in front of the coils, so that by measuring the signal amplitude or phase modulation, the speed and the direction of movement, or position of the object to be detected, is detected.

11 Claims, 8 Drawing Sheets

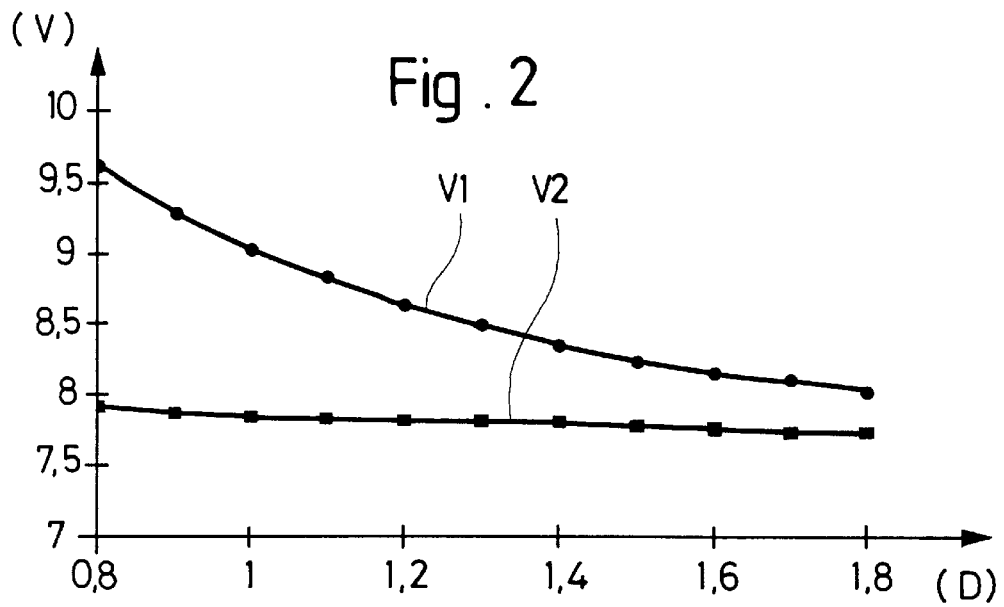
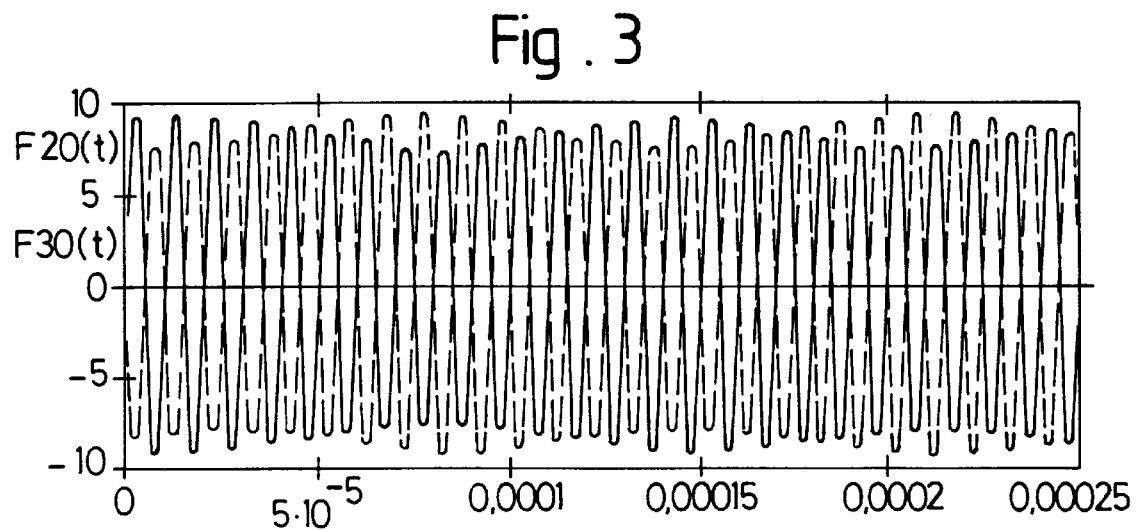
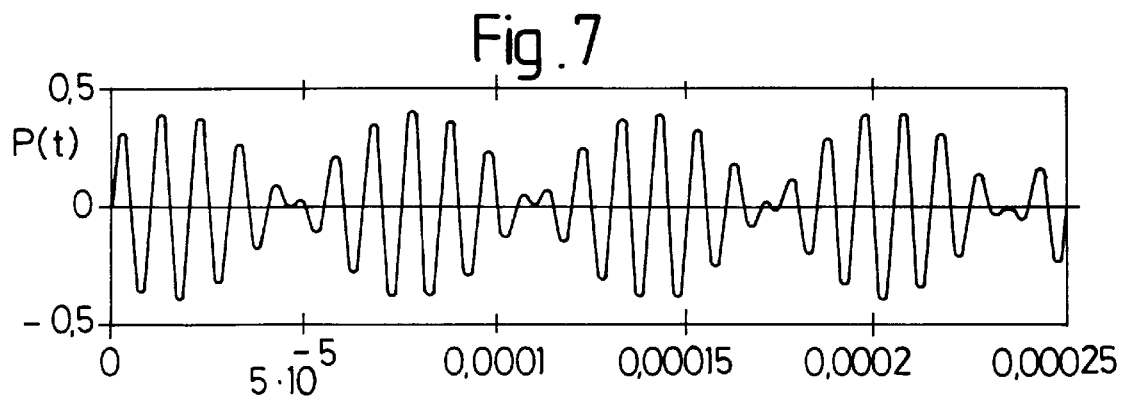

DEVICE FOR DETECTING POSITION AND MOVEMENT BY USING MAGNETIC FIELD VARIATION

BAKCGROUND OF THE INVENTION

The present invention concerns the domain of magnetic field variation sensors for detecting the position and/or the movement of a structured moving part.

Magnetic field variation sensors comprise sensors known as "inductive AC-excited" sensors and "Eddy current" sensors. Magnetic induction sensors use the concentration effect of the magnetic field of a part made of a ferromagnetic material, while Eddy current sensors use the effect of the change in the magnetic field by Foucault currents generated in a metal part by said magnetic field. While sensors of the first type allow a relatively low frequency alternating magnetic field (typically<50 kHz) to be used, sensors of the second type require the production of a relatively high frequency alternating magnetic field (typically>20 kHz).

Magnetic induction position sensors using the ferrite core electric transformer principle are known. Patent document EP-B1-0 453 824 discloses a sensor allowing the transversal position of a railway vehicle wheel to be detected with respect to a metal rail on which it runs, the rail being situated in an airgap of the core. Such devices have the drawback of requiring a lot of space. Moreover, they do not allow detection of the movement of miniature parts.

Miniature coreless proximity sensors are also known. An article entitled "Design of an inductive proximity sensor using a two coil planar transformer", by V. Gupta and D. P. Neirik published in the magazine SPIE, volume 2642, page 173, discloses such a proximity sensor. This miniature device uses two imbricated planar inductive coils. The presence of a metal plate changes the resonance frequency and phase shift between the transmitter coil and the receiver coil. Such a device allows the measurement of the distance from the metal plate, but it does not allow the measurement of the angular position of a rotating metal part, or the linear position of a part moving transversally with respect to the axis of the sensor. Another drawback of this device is the requirement for a complex electronic frequency sweep and phase measuring circuit.

In the description which follows, it will be understood that, unless indicated otherwise, "induction sensor (or detection device)" designates the inductive AC-excited and Eddy current types of sensor.

SUMMARY OF THE INVENTION

An aim of the present invention is thus to overcome the aforementioned drawbacks of the prior art by providing a miniature inductive detection device, allowing identification of the instantaneous relative position and/or the speed of a structured moving part without contact with such part. More particularly, an aim of the invention is to provide a device detecting a zero relative rotation speed of a moving part.

Another aim of the invention is to provide a miniature movement detection device supplying digital signals for counting and an analogue signal proportional to the position of the moving part.

These aims are achieved, according to the invention, by placing planar coils in a differential transformer configuration. The coupling between the primary coil and the secondary coils varies, in a complementary manner, according to the position of the metal part. This phenomenon is due to the reorientation of the lines of the magnetic field by the structures provided on the part. The coupling variations thus indicate the relative position or the speed of the part.

The invention therefore concerns a device for detecting the relative position and/or movement of a part able to move within a plane, the part comprising a material capable of influencing a magnetic field, the device comprising, at least, a primary coil inducing a magnetic field and at least a pair of secondary coils for picking up the magnetic field, the secondary coils being planar, characterised in that the coils are arranged substantially parallel to the plane of movement of the part, the secondary coils being arranged according to a differential structure with respect to the primary coil, and in that the part comprises structured zones, so that the magnetic field picked up by a secondary coil is changed by the presence of a structured zone and that the position or the speed of movement of the part is detected.

According to one embodiment, the primary coil is fed by an alternating signal and a detection circuit measures the amplitude modulation of a signal picked up by a secondary coil, the movement of the part modulating the signal pick up.

An advantage of the invention is that it allows detection of movement of any metal part, whether or not it is ferromagnetic.

Another advantage of this device is that it accurately detects a zero speed of the part. Since the device is active at zero speed, it allows identification of the rest position.

BRIEF DESCRIPTION OF THE DRAWINGS

Other aims, features and advantages of the invention will appear more clearly upon reading the following description of particular embodiments, the description being given by way of non-limiting example and in conjunction with the attached drawings in which:

FIG. 2 is a diagram showing the level of picked-up signals with a detection device according to the invention;

FIGS. 3 to 7 are timing diagrams showing signals obtained with a detection device according to the invention;

DETAILED DESCRIPTION OF THE INVENTION

In the description and claims which follow, the term "planar coil" will be used to designate a flat coil, i.e. a coil whose thickness is small with respect to the other dimensions.

The implementation example which follows concerns, in particular, the detection of the angular position of a rotating toothed wheel, and the determination of its speed and its direction of rotation. However, the invention is not limited to the detection of rotational movement. Any planar movement (linear, zigzagging) may be detected and the relative position measured. Finally, detection may be achieved on non-metal parts, provided that the part comprises conductive targets along the path of movement of the sensor.

Figure 1:
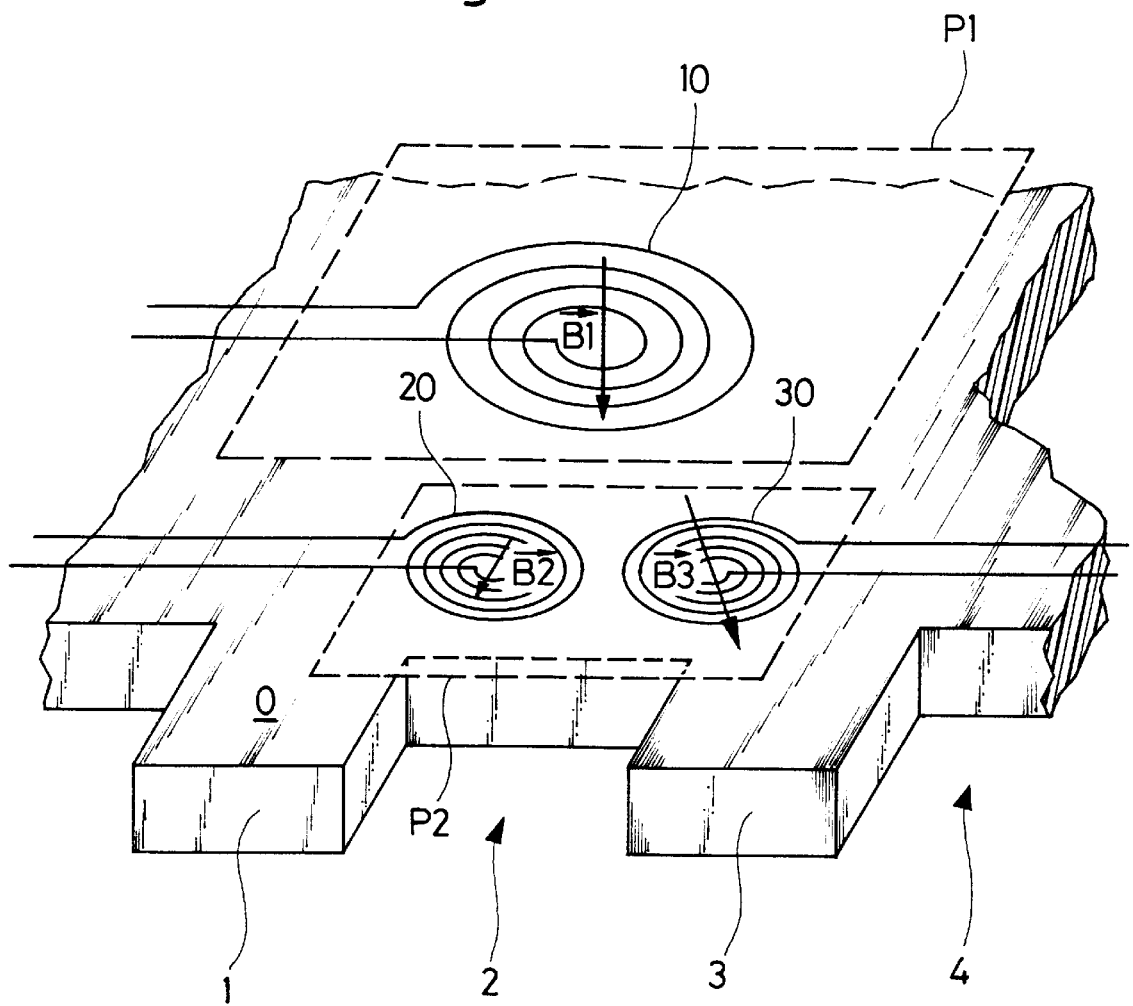
FIG. 1 shows a schematic diagram of the detection device according to the invention.

FIG. 1 is a schematic diagram of the invention. It shows a toothed wheel 0 made of a metal material, the rotational speed and/or angular position relative to the stop position of which is sought to be determined. It will be considered initially that toothed wheel 0 is made of soft iron. A detection device according to the invention is arranged parallel to the plane of toothed wheel 0, at the level of the teeth and notches 1, 2, 3, 4 thereof.

The device of FIG. 1 comprises three separate planar coils 10, 20, 30 formed respectively of a spiral conductor. This conductor is a metal track deposited on a silicon substrate by any appropriate means. Coil 10 is intended to form the primary coil. It generates a magnetic field B1 covering, at least, the surface of a notch 2 and a tooth 3 of toothed wheel 0. Primary coil 10 is arranged in a plane P1 parallel to the plane of toothed wheel 0.

Coils 20, 30 act as secondary coils, picking up the magnetic field induced by primary coil 10. It can be seen in FIG. 1 that both secondary coils are arranged in a same plane P2, parallel to the plane of toothed wheel 0. Plane P2 is interposed between plane P1 of primary coil 10 and toothed wheel 0. Secondary coils 20 and 30 have, for example, a small size with respect to primary coil 10. Each secondary coil 20 or 30 preferably covers a surface corresponding to the surface of a tooth or a notch only. Secondary coils 20 and 30 are arranged facing primary coil 10, so that each secondary coil 20 or 30 picks up a part B2 or B3 of magnetic field E1.

It will be understood that as a function of the application, the dimensions, even the position, of the coils will have to be adapted, in particular, to the dimensions of the target. Moreover, it has been observed that the product of the modulation factor of the voltage induced by the amplitude of such voltage were maximal when the secondary coils were in an off-centre position with respect to the primary coil and that the off-centre position depended upon the dimensions of all the elements of the sensor.

The arrangement of the coils shown in FIG. 1 allows a differential measurement to be made. The magnetic flux B1, generated by primary coil 10, is distributed between The two separate secondary coils 20 and 30. Such a structure allows the difference between fields B2 and B3 to be measured, independently of any variations in the value of field B1 and the distance between plane P2 and moving part 0. The differential structure is preferably obtained by arranging the two secondary coils 20 and 30 in plane P2, both facing primary coil 10. However, other arrangements may be envisaged, provided that each secondary coil 20, 30 picks up part of the flux of magnetic field B1 generated by the primary coil and that the deviation of primary flux B1 towards a secondary coil is made to the detriment of the part of flux going to the other secondary coil. The secondary coils may, for example, be placed in two staggered planes. Coils 10, 20, 30 may even be placed almost in the same plane.

In operation, primary coil 10 and secondary coils 20, 30 are coupled in accordance with the principle of a differential transformer. The presence of soft iron teeth 1, 3 of toothed wheel 0 deviates and channels magnetic field B1 generated by primary coil 10. Thus in the example of FIG. 1, the presence of tooth 3 of toothed wheel 0 in the axis of secondary coil 30 increases magnetic field B3 which passes through coil 30. Conversely, at the level of empty notch 2 of toothed wheel 0, magnetic field B2 is low. The passing of a metal target 1 or 3 thus changes the lines of the magnetic field generated by primary coil 10, so that a difference appears between fields B1 and B2 picked up, respectively, by coils 20 and 30. The difference between fields B2 and B3 thus allows the presence or passing of a metal target tooth to be detected.

According to the invention, primary coil 10 is fed by an alternating current, so that an alternating signal appears at the terminals of secondary coils 20 and 30.

The amplitude of the signal picked up by a secondary coil 20 or 30 is changed by the presence of a tooth. FIG. 2 shows the signal amplitude V picked up by a secondary coil in the presence (V1) and the absence (V2) of a tooth. Amplitudes V1 and V2 are indicated as a function of the spacing D between a secondary coil and toothed wheel 0. In the configuration of FIG. 1, for example, the signal appearing at the terminals of secondary coil 30 is much more significant than that of secondary coil 20. When the toothed wheel has rotated slightly, and notch 2 is in the axis of secondary coil 30, the situation is reversed, the signal appearing at the terminals of coil 30 is weak. Since soft iron tooth 1 is then in the axis of secondary coil 20, the signal at its terminals is high. The stop position of toothed wheel 0 can thus be determined, by measuring the amplitude of the signal picked up by a secondary coil 20 and by comparing it to the amplitude of the signal picked up by secondary coil 30. It is to be noted that amplitude V1 remains greater than amplitude V2 over a large range of distance D. In the example of FIG. 2, although the range of distance varies between 0.8 mm and 1.8 mm, the minimum value of V1 is 8.1 mV and thus remains greater than the maximum value of V2 of 7.9 mV. By fixing a threshold between such extremes, the device allows one to distinguish between the presence and the absence of a target tooth despite the variations in distance D of the part to be detected.

When toothed wheel 0 rotates, the signal at the terminals of each secondary coil 20 and 30 thus passes from a high level to a low level corresponding to the passing of teeth 1, 3 and notches 2, 4.

FIG. 3 thus shows, in full lines, picked up signal F20(t) at the terminals of a secondary coil 20 and, in dotted lines, picked up signal F30(t) at the terminals of secondary coil 30. It is seen that the signal at the terminals of a secondary coil is modulated in amplitude by the passing of the teeth of a target.

The rotation speed of the part is obtained via demodulation of the signal generated by coil 20 or 30. The modulation frequency allows the frequency of passing of the teeth to be determined and, consequently, if the teeth are regularly spaced, the rotation speed of the moving part. An alternating current, of greater frequency than the maximum passaging frequency of the teeth of toothed wheel 0, is preferably applied to primary coil 10.

The measurement of the rotational direction is based upon the fact that two coils 20 and 30, which are staggered with respect to the teeth of the part, are used. The modulation of the signal at the terminals of secondary coil 30 is phase shifted with respect to the modulation of the signal at the terminals of secondary coil 20. This phase shift corresponds to the spacing of the coils relative to the spacing of the teeth.

For example, if coils 20, 30 have a centre to centre distance equal to half a step of toothed wheel 0, the modulation envelopes of signals F20, F30 will be phase-shifted by 180 degrees, as is seen in FIG. 3.

The invention also provides for the measurement of the amplitude of a signal picked up by a secondary coil.

A detection circuit preferably demodulates the signals picked up by secondary coils 20, 30 according to the signal applied to primary coil 10. In order to determine the rotational direction, the detection circuit compares the amplitude modulations of the signals picked up by the secondary coils and determines the direction of movement of the part.

An advantage of the device according to the invention is that the amplitude of the picked up signal is independent of the rotational speed of the part. Zero speed may thus be detected, the device being active even when the toothed wheel is not moving. It has been seen that a rest position of toothed wheel 0 may then be detected, the picked up signals indicating whether each of the coils is facing a tooth or a notch. Instead of this binary indication, a more precise indication of the rest position may be provided, which varies continuously between detection of a tooth and detection of a notch. For example, the precise indication of the rest angle may be calculated from the modulation levels of signals F20 and F30.

According to a preferred alternative embodiment, the device is provided with at least three secondary coils in order to allow easy detection of the position, speed and rotational direction of the target.

For ease of explanation, it was indicated hereinabove that the part to be detected was made of soft iron. Each soft iron tooth thus plays the part of a core channelling the magnetic field between primary coil 10 and a secondary coil 30. The detection device thus forms a magnetic sensor.

However, the detection device may also use Eddy currents. Thus, with a non-magnetic metal toothed wheel, currents are formed within the metal tooth subjected to a magnetic field, so that magnetic field B1 is driven outside the tooth, the field being zero in the metal. Contrary to the previously envisaged case of a soft iron toothed wheel (see FIG. 1), magnetic field B2 passing through notch 2 will be stronger than field B1 directed towards non-magnetic metal tooth 3. The situation is thus reversed, the high signal being picked up when passing in front of a notch and the low signal when passing in front of a tooth. In this alternative embodiment, the speed, the rotational direction and the position of the moving part can thus still be detected, the signals having simply changed sign.

More generally, the speed, position and/or direction of movement of a non-metal moving part may be detected, by using metal parts passing of which will be detected by the detection device according to the invention. The invention is thus generally applicable to detection of the position, movement, and structure of a part capable of moving, the part comprising alternating zones of low and high magnetic permeability.

Figure 8:
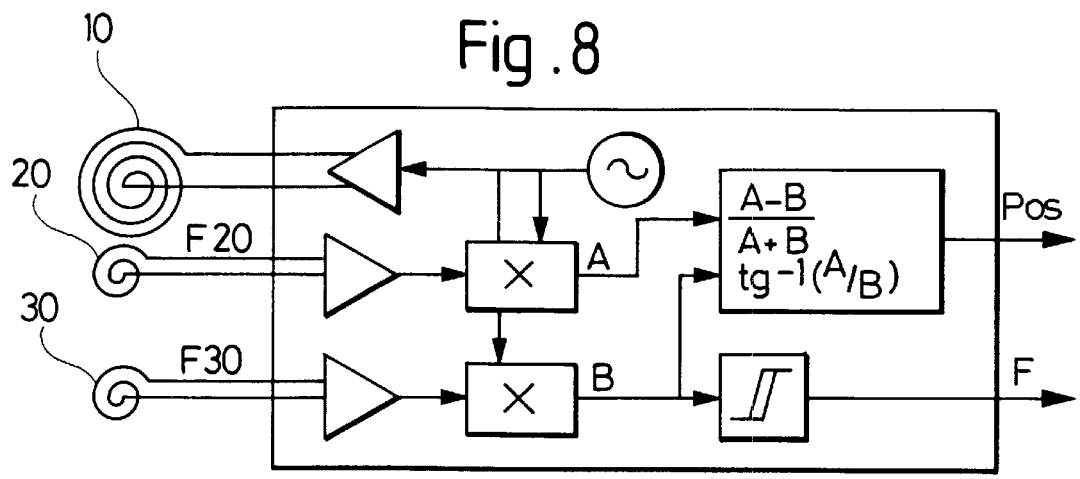
FIGS. 8 to 10 show detection circuits able to be used in conjunction with the detection device according to the invention.
Figure 9:
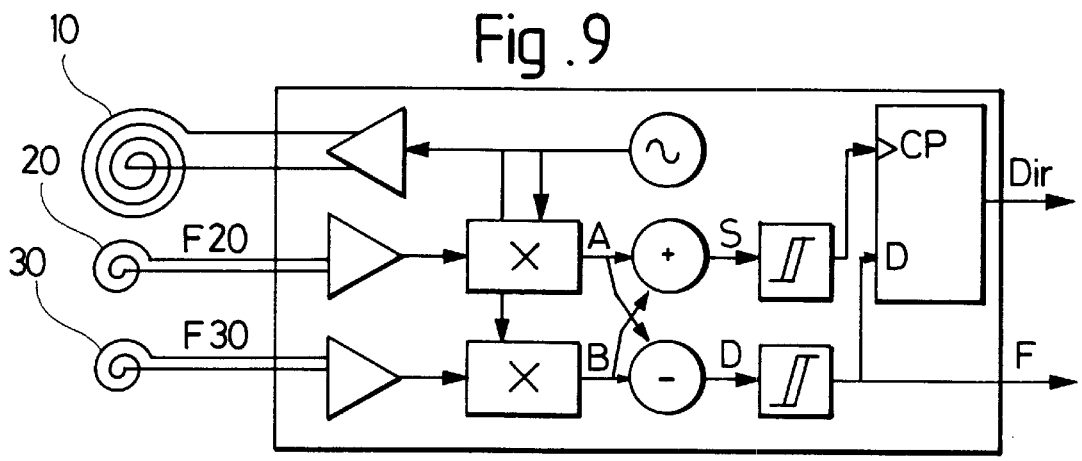
Figure 10:
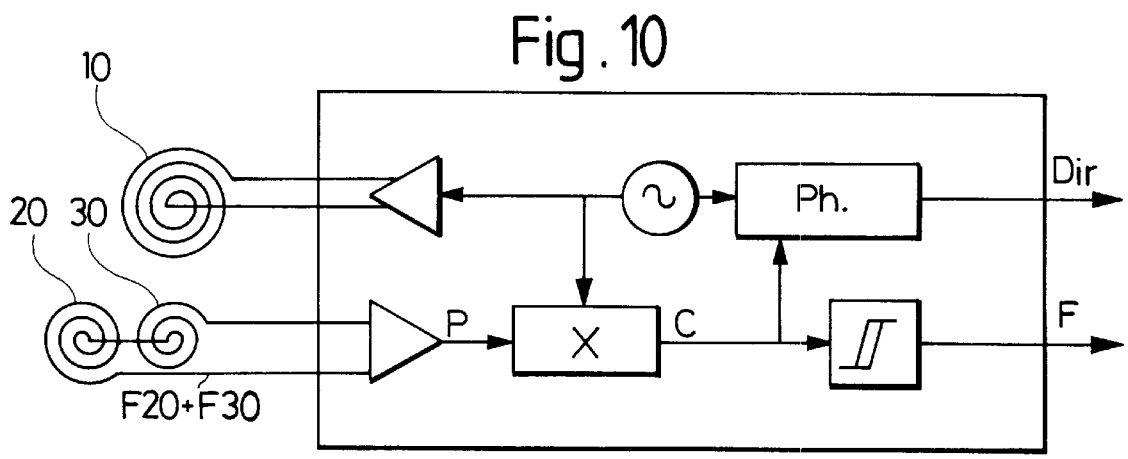

In order to detect correctly the speed and direction of movement of the moving part, several signal processings may be envisaged. FIGS. 4 to 7 illustrate signals derived from the combination and demodulation of two signals F20 and F30 of FIG. 3. In FIGS. 8 to 10, three corresponding alternative detection circuits are envisaged. It will be noted that the operation of the detection device is particularly well suited to digital speed and direction of movement coding, or digital position coding.

Figure 4:
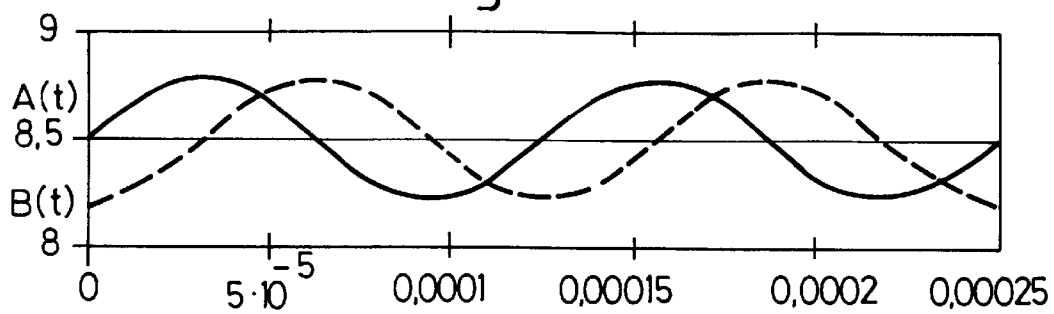

FIG. 4 illustrates separate demodulation of signals F20 and F30 of FIG. 3. Signals A and B correspond to the result of the respective demodulation of signal F20 and signal F30. It will be noted that signals A and B are phase shifted by 90°. The phase shift is reversed when the direction of movement or rotation changes.

FIG. 8 shows a first detection circuit corresponding to this signal processing principle. Each coil 20, 30 is connected to a preamplifier followed by a demodulator X, which also receives the primary alternating signal. Demodulated signal A corresponding to secondary coil 20 and demodulated signal B corresponding to a signal picked up by secondary coil 30 are thus obtained. One of the demodulated signals, for example signal B is applied to the input of a Schmitt trigger to supply a binary signal F whose frequency corresponds to the passage frequency of zones of low and high magnetic permeability. However as can be seen in FIG. 4, demodulated signals A and B are alternating signals with a high offset component. In order to operate properly, the Schmidt trigger must have a threshold level set around the value of this continuous voltage. Detection of the position Pos is provided with a logical block which performs, in particular, the calculation of the value of (A−B)/(A+B) and of Arctg (A+B), from demodulated signals A and B.

Figure 5:
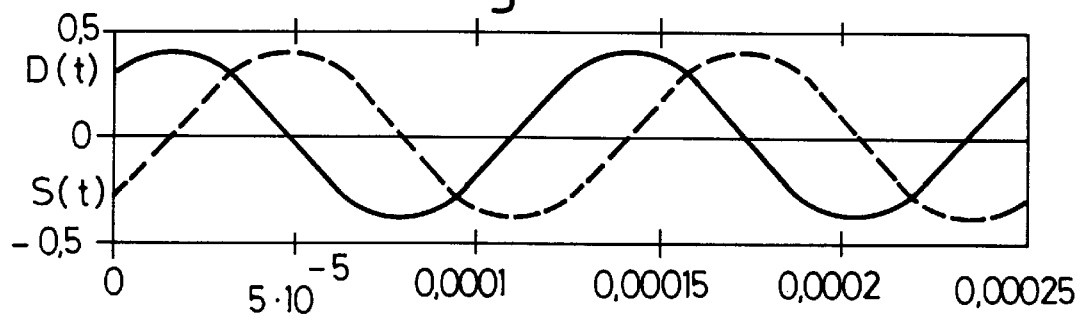
Figure 6:
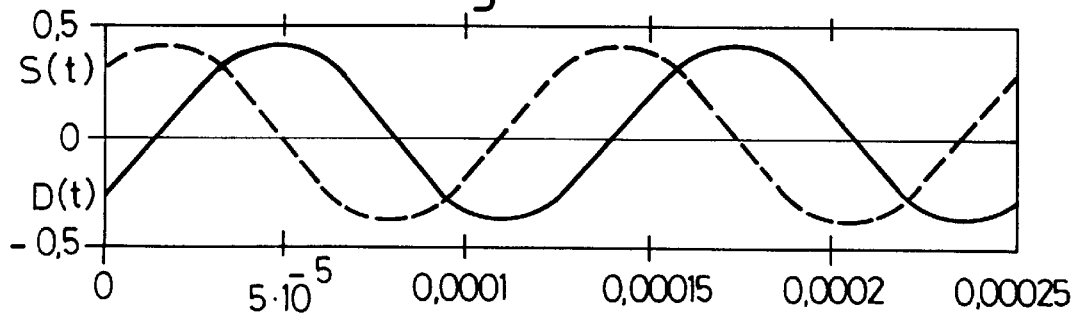

FIGS. 5 and 6 illustrate signals generated by circuits provided with means for removing the drawback of continuous or offset voltages of demodulated signal. By calculating difference D of two demodulated signals A and B, a signal of substantially zero average value is obtained. Another signal S of zero average may be obtained by adding up demodulated signals A and B and obtaining an average. Detection of the value of signal D or S passing to zero is thus all that is required to indicate the frequency with which the zones of low or high magnetic permeability pass. As is shown by FIG. 6, when the direction of movement changes, the phase shift of signal D with respect to signal S is reversed.

FIG. 9 illustrates a detection circuit corresponding to the signal processing principle explained in the preceding paragraph. Like the circuit of FIG. 8, this detection circuit comprises a preamplification and demodulation stage for each secondary coil 20 or 30, providing signals A and B respectively. An adder adds up signals A and B to provide sum signal S. A subtracter provides signal D corresponding to the substraction of A and B. The two signals S and D are respectively applied to a Schmitt trigger to transform them into binary form. Signal F from the Schmitt trigger supplied by signal D is a signal whose frequency indicates the speed of movement of the moving part. A flip-flop (currently called a "D" latch) compares the moments of transition around value 0 of signals D and S, shaped by their respective Schmitt trigger, to be able to provide a binary indication of direction Dir. Signal F is thus applied to input D of the circuit, while the clock input CP is connected to the output of the Schmitt trigger supplied by signal S. The signal summing or subtracting principle may be even more advantageous as is explained in the following paragraph.

It has been shown that the sum of the two (non demodulated) signals F20 and F30, picked up by secondary coils 20 and 30, has a much greater modulation amplitude than the signals themselves.

FIG. 7 thus illustrates the sum P(t) of the two signals F20(t) and F30(t) of FIG. 3. It is clearly seen that signal P is much more profoundly modulated than signals F20 and F30. It is thus particularly advantageous to measure the amplitude modulation of sum signal P obtained at the terminals of the interconnected coils.

FIG. 10 illustrates a detection circuit performing this operation. The two coils 20 and 30 are connected in series, the centre of coil 20 being connected to the centre of coil 30, both coils 20 and 30 being formed of a respective single metal spiral, and bring wound in opposite directions. A preamplifier supplies a signal P reproducing the sum signal F20+F30. Demodulation is then achieved via a stage X which further receives the alternating signal applied to primary coil 10. A demodulated signal C is thus obtained the frequency of which corresponds to the frequency with which the zones of low and high magnetic permeability pass, and thus to the rotational speed. Signal C is shaped by a Schmitt trigger which supplies a binary signal of the same frequency as signal C.

Detection of the direction of rotation may be obtained by comparing the phase of signal C and the primary alternating signal. The detection circuit thus comprises a phase comparator Ph receiving signal C and said primary alternating signal. Signal Dir, resulting from the comparison operation is, for example, a binary signal whose state 0 or 1 indicates the direction of movement.

Other alternative embodiments of the detection circuit may be envisaged without departing from the scope of the invention. For example, the demodulation stage of one of the circuits of FIGS. 8, 9 or 10 may be combined with the block for calculating position Pos of FIG. 8, or the flip flop of FIG. 9, or the phase detecting stage of FIG. 10.

Moreover, the successive transitions of binary signal F may be registered by a counter in a memory to indicate permanently the effective angular position of the moving part, for example, the toothed wheel.

A preferred embodiment of the position and movement detection device will now be described in more detail. It concerns making the device in miniature form.

According to this embodiment, the planar coils are made by deposition and/or etching, as required, of a conductive layer on one or more substrates, for example, made of silicon. One embodiment even provides for the use of two faces of the same substrate. The primary coil may be deposited and/or etched on the first face while the secondary coils are deposited and/or etched on the second face.

Figure 11:
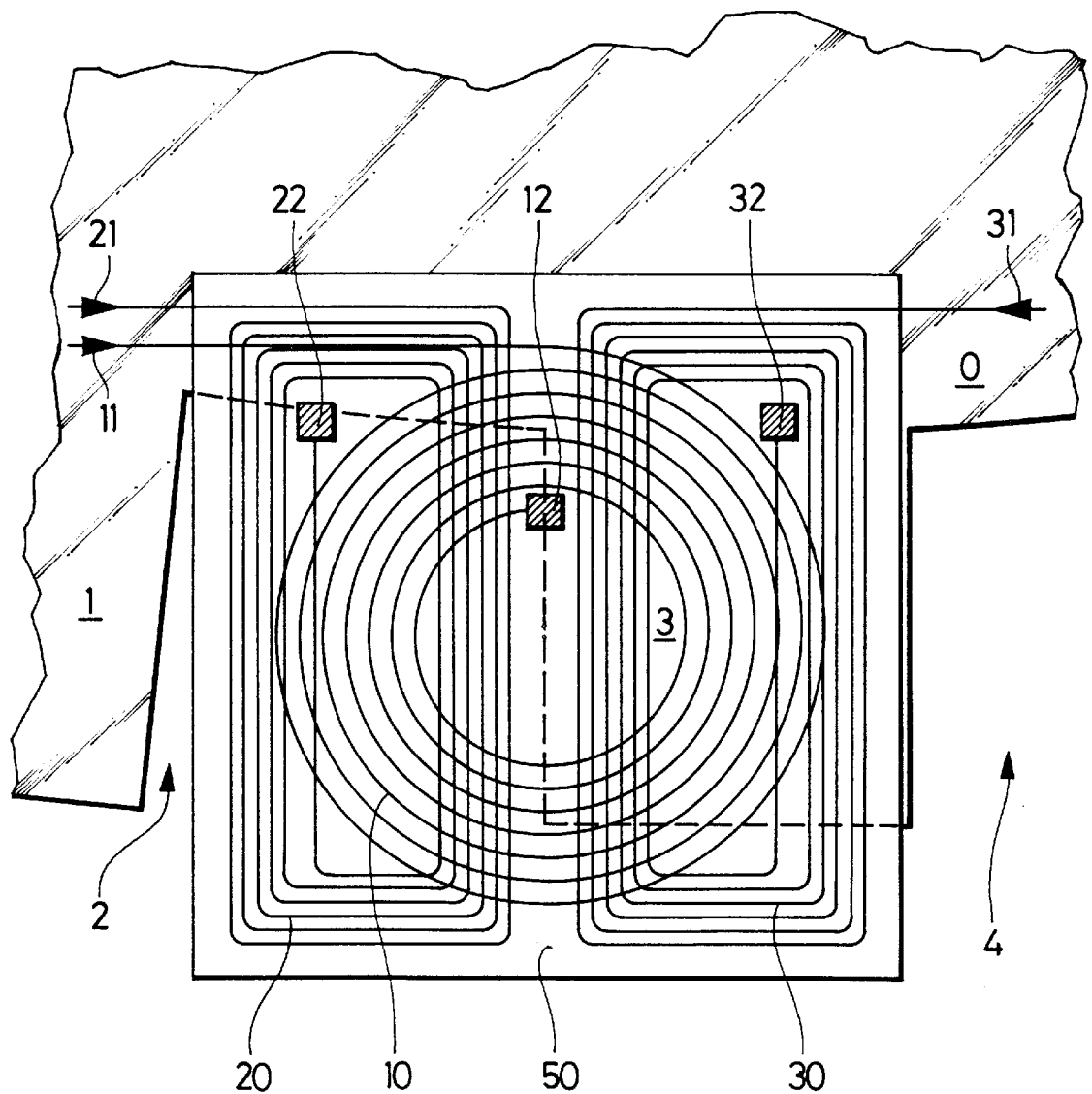
FIG. 11 shows a top view of a detection device according to the invention made on a silicon substrate.

FIG. 11 illustrates such an embodiment of coils on a plate or substrate 50, which may be made of silicon. The moving part, in this case a toothed wheel 0, is shown in the background. Plate 50 is arranged, without contact, parallel to toothed wheel 0. The dimensions of plate 50 are substantially equal to the arc covered by a tooth 3 and a notch 2 of toothed wheel 0. Primary coil 10 is a metal spiral the external spire of which almost reaches the edges of plate 50. The spiral is interrupted before reaching the centre so as to keep a central disc without a spire wherein magnetic field B1 is substantially constant. The two secondary coils 20 and 30 are made on the opposite face of the plate, each covering a half plane of such face. Coil 30 thus covers a half plane corresponding (see FIG. 11) to tooth 3 of toothed wheel 0.

Preferably, the face comprising secondary coils 20 and 30 is oriented towards the part to be detected so as to correctly pick up the magnetic field generated by primary coil 10 and channelled by tooth 1, 3 of toothed wheel 0. Preferably, secondary coils 20, 30 are formed of rectangular or square spirals so that they cover a maximal surface for picking up magnetic field B1, B2. The entire spiral of primary coil 10 is thus covered by secondary coils 20 and 30.

The device according to the invention may also be made on the same face of a substrate. This arrangement allows the coils to be made of different metals. The primary coil may thus be made of a good conductive metal, for example copper, which limits the resistivity of the inductive element. The secondary coils may be made of a metal allowing fine etching, for example aluminium, so that each secondary coil has the greatest number of signal generating rotations, for a given space requirement.

Finally, connecting surfaces 11, 12, 21, 22, 31, 32 are provided at the ends of the coils to connect them to the detection circuit. It is to be noted that the secondary coils are spirally wound in reversed direction in order to facilitate connection thereof in the order provided in FIG. 10.

According to an advantageous alternative embodiment of the invention, the detection circuit is made on a silicon plate, which itself acts as substrate for the primary and secondary coils. Integration of the device, in this case, is optimum and contact pads 12, 22 and 32 may be directly connected to the integrated detection circuit. Assembly and/or connection operations are thereby greatly simplified. Indeed, one may envisage making secondary coils 20 and 30 on a same face and the primary coil on the other face or even on a second substrate which is fixed, for example, by gluing, to the first substrate. One may also make all the coils on the same face, either by separating them from each other, or by superposing them (the primary coil above the secondary coils) and interposing a layer of insulating material between them.

These arrangements have the advantage of allowing advanced miniaturisation, of reducing or even removing problems of wire connections and reducing sensitivity to electromagnetic interference.

FIGS. 12 to 26 show various alternative of integrated embodiments of the device according to the invention.

Figure 12:
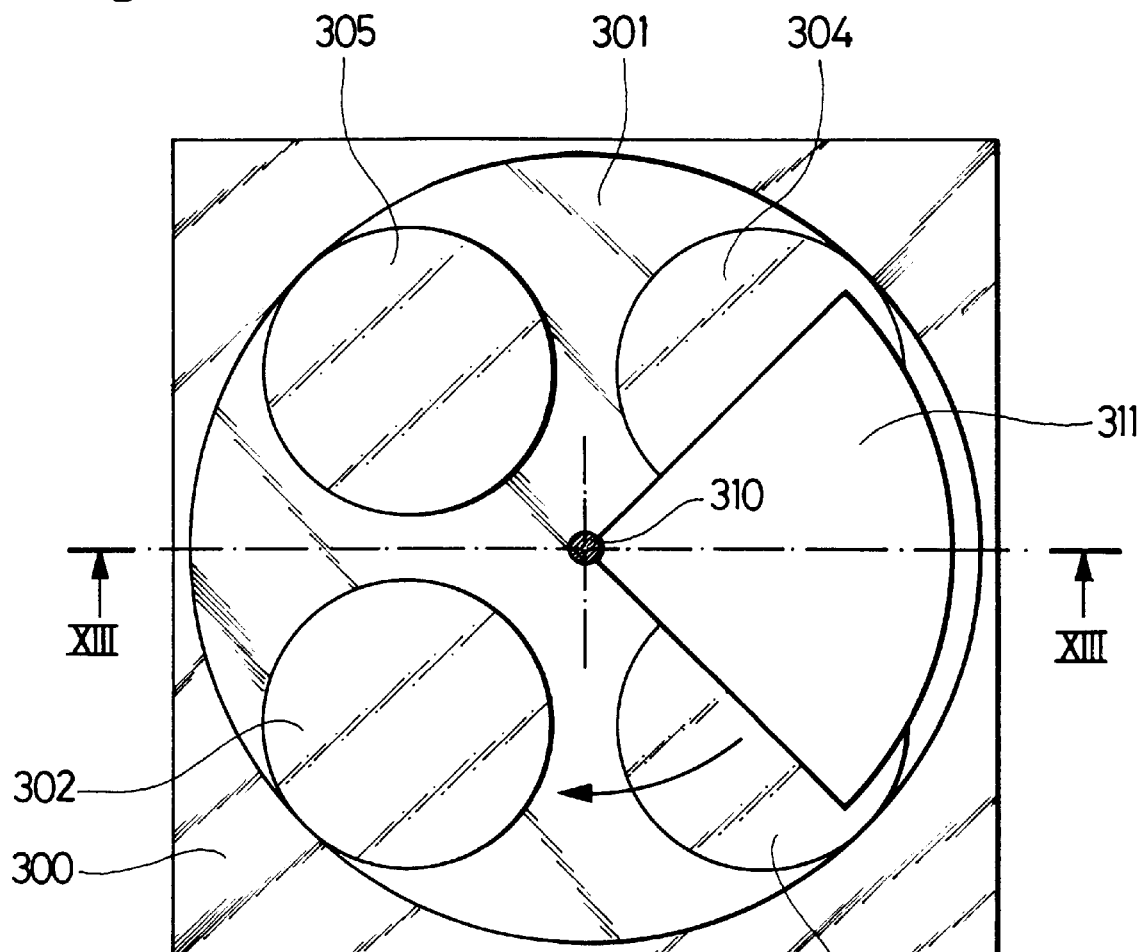
FIG. 12 shows a top view of a detection device according to the invention which is also made on a silicon substrate.
Figure 13:
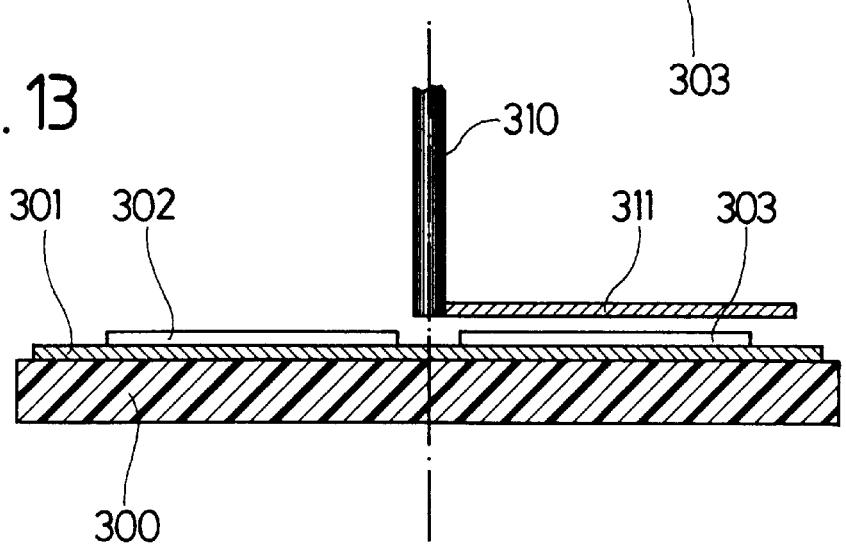
FIG. 13 shows a cross-section view along line XIII—XIII of the device of FIG. 12.

FIGS. 12 and 13 show an embodiment on a single substrate made of a semi-conductive material, wherein an integrated circuit 300 is made and, at the surface, a circular primary coil 301, for example, made of copper or gold, surmounted by four secondary coils 302, 303, 304, 305, for example made of aluminium.

By way of non-limiting example, the primary coil will be made by galvanic deposition, while the secondary coils will be made with the aid of photolithographic and etching techniques, such as those used in the manufacture of integrated circuits.

The object of detection is, in this case, the position and speed of rotation of an shaft 310. This shaft has been provided with a metal sector 311 which rotates above coils 301 to 305, in order to act as target for detecting the angular position of shaft 310. Sector 311 may be made of ferromagnetic metal, according to the type of operation envisaged.

FIGS. 14 to 26 illustrate alternative integrated embodiments obtained considering that:

the coils may be arranged on separate chips of an integrated detection circuit, which is connected to the coils by wires;

or that each face of the integrated circuit (or of a chip) comprises one type of coil, the face of the integrated circuit (or the chip) oriented towards the moving part comprising the secondary coils, the opposite face comprising the primary coil;

or that the primary coil is a non-integrated field coil;

or that the device is formed of two chips, one chip on which the primary coil is arranged and another chip on which the secondary coils are arranged; both chips being attached;

or that the primary and secondary coils, instead of being superposed, are made on a single face. This sole integrated circuit face is then divided into three zones in each of which is arranged a coil;

or that deposited ferromagnetic layers, for example FeNi, or metal layers may be placed at the centre and/or on the surface of a coil in order to channel the lines of the magnetic field towards the part to be detected;

or that a ferromagnetic frame or a metal armouring may surround the detection device, again in order to channel the lines of the magnetic field.

Figure 14:
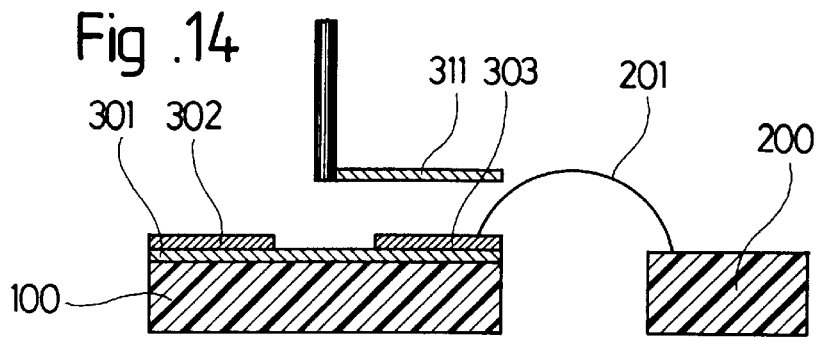
FIGS. 14 to 21 show in cross-section various alternative embodiments of detection devices according to the invention implemented as integrated circuits.

FIG. 14 thus shows an alternative embodiment of the device according to the invention of FIG. 12, wherein the detection circuit is separated from the actual sensor. It is thus seen that secondary coils 302, 303 arranged above a primary coil 301, which is itself arranged on the surface of a silicon substrate 100, are connected to the integrated detection circuit 200, which may be placed at a distance from the actual sensor 100 by wires 201.

Figure 15:
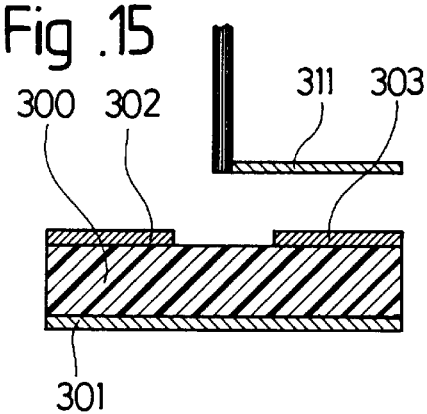

FIG. 15 shows an alternative of the embodiment of FIG. 12, wherein primary coil 301 is arranged on the lower face of integrated circuit 300, secondary coils 302, 303 being arranged on the upper face of the integrated circuit, which is directed towards moving part to be detected 311.

Figure 16:
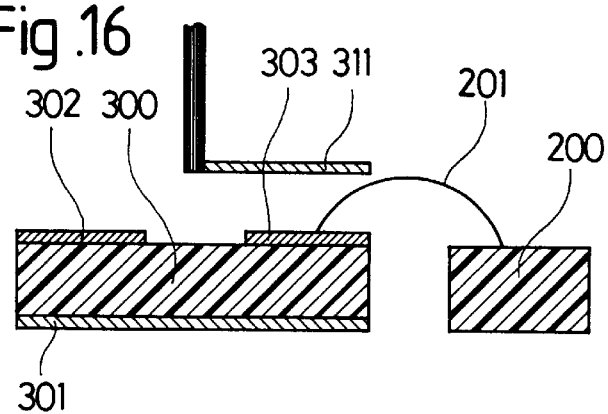

FIG. 16 shows an alternative of FIG. 15 wherein the primary coil is realised on the lower face of a silicon substrate 300, secondary coils 302, 303 being arranged on the upper face of said silicon substrate 300 and the coils being connected to an integrated detection circuit 200, which is separated from silicon chip 300.

FIG. 17 again shows that the primary coil may be made in the form of an external field coil (non-integrated and non-planar), such external field coil 401 being able to be arranged under integrated detection circuit 300, the secondary coils preferably being made in the form of planar coils 302 and 303 arranged on the surface of integrated detection circuit 300.

Figure 17:
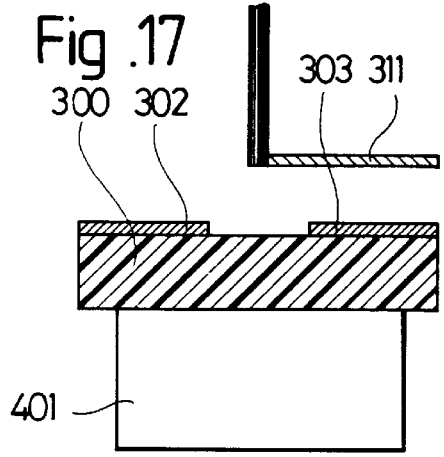
Figure 18:
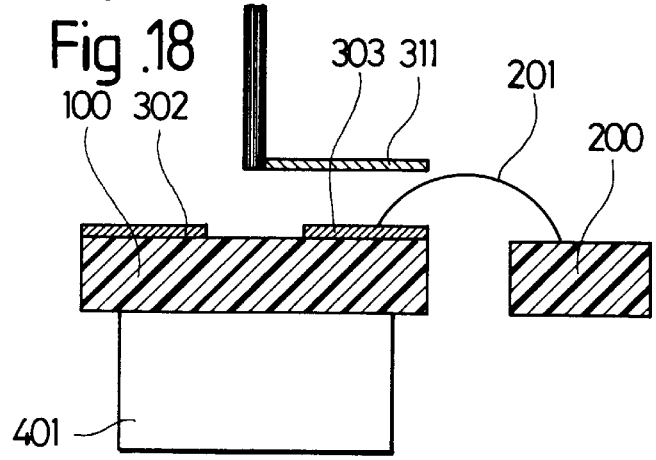

FIG. 18 shows the alternative embodiment of FIG. 17 wherein the external field coil is arranged under silicon substrate 100 on which are arranged secondary planar coils 302 and 303. The coils are connected to an integrated circuit 200, separated from the actual sensor, which is formed by silicon chip 100.

Figure 19:
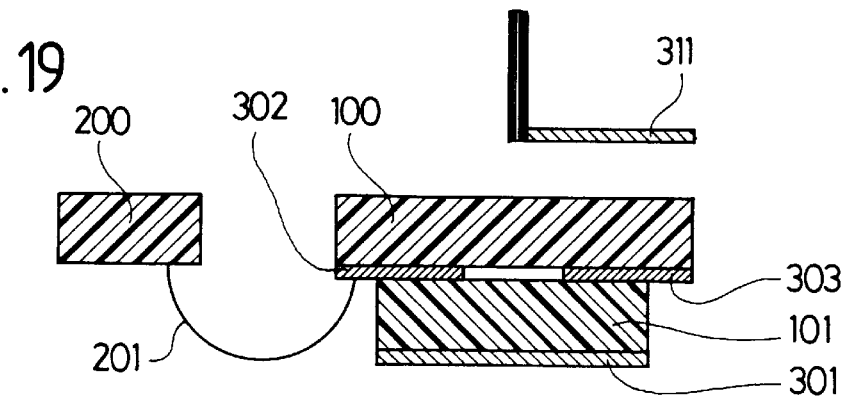

FIG. 19 recalls an alternative embodiment wherein secondary coils 302, 303 are arranged on a silicon chip 100, primary coil 301 being arranged on another silicon chip 101. The two chips 100 and 101 are attached, the coils being connected to a separate integrated detection circuit 200. Chip 100 comprising secondary coils 302, 303 is oriented towards part to be detected 311, so that secondary coils 302, 303 are interposed between primary coils 301 and moving part 311. This embodiment on two chips is advantageous when primary coil 301 and secondary coils 302, 303 are made of different metals and have relatively significant dimensions.

Figure 20:
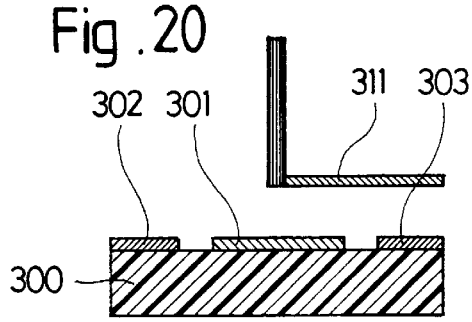

FIG. 20 shows that all the coils have been made on the same face of integrated circuit 300. Primary coil 301 is arranged at the centre of such surface of integrated circuit 300, facing the shaft 310 of the rotating part to be detected 311. Secondary coil 302 is arranged on a neighbouring zone of primary coil 301, on the surface of integrated circuit 300. The other secondary coil 303 is arranged on the other side of primary coil 301. Thus secondary coils 302, 303 pick up lines of the magnetic field running from a pole of primary coil 301 and returning to the other pole of such coil. These lines of the magnetic field are of course changed when metal part 311 passes.

Figure 21:
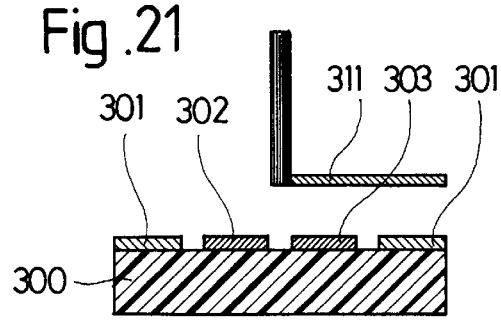

FIG. 21 shows an alternative of FIG. 20 wherein the secondary coils are arranged at the centre of integrated detection circuit 300, primary coil 301 being formed of spirals following the contour of integrated circuit 300. The two secondary coils 302, 303 are thus each disposed in half of the central disc formed in the middle of primary coil 301.

Figure 22:
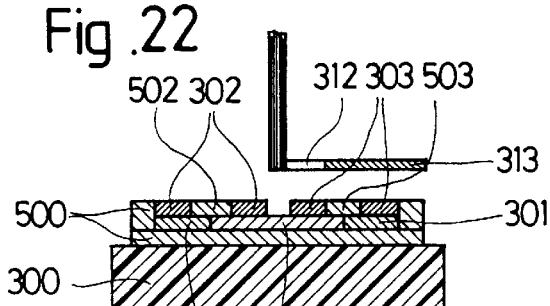
FIGS. 22 and 23 show, in cross-section, two alternatives of a second embodiment of the detection device according to the invention.

It is seen in FIG. 22 that soft iron or copper structured films (meaning that they have been made in a desired shape) have been inserted at the centre and on the surface of the coils. An integrated circuit 300 is thus surmounted by a soft iron film 500 on which primary coil 301 is arranged. The centre of coil 301 has been recessed to leave space for another soft iron structured layer 501. Finally, each half plane of primary coil 301 and its central layer 501 is surmounted by a respective secondary coil 302, 303, at the centre of which a layer of soft iron 502, 503 is inserted. The lines of the magnetic field are thus channelled towards the centre of the coils, which considerably increases the magnetic field picked-up and the signal detected.

Figure 23:
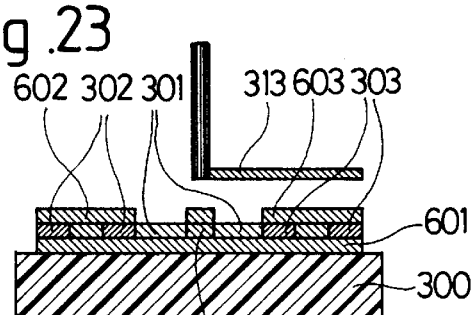

FIG. 23 shows an alternative of FIG. 12 wherein an integrated circuit 300 is again surmounted by a soft iron structured layer 601 which is surmounted, in the central part thereof, by a primary coil 301 and, in the lateral parts thereof, by two secondary coils 302 and 303. The centre of primary coil 301 has been recessed to leave space for another layer of soft iron 501. Likewise, the centres of secondary coils 302 and 303 comprise, respectively, a soft iron core. Secondary coils 302 and 303 may also be covered by a respective layer of soft iron 602, 603, such layers separating them from the space wherein part to be detected 311 moves.

Figure 24:
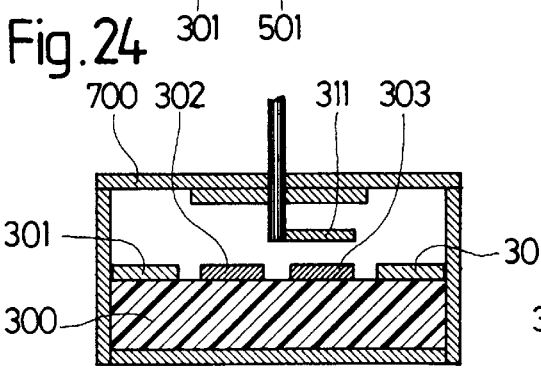
FIGS. 24 to 26 show, in cross-section, three alternatives of a third embodiment of the detection device according to the invention.

FIG. 24 shows an alternative of the embodiment of FIG. 21, wherein the device formed by integrated detection circuit 300, comprising coils 301, 302 and 303, and moving part to be detected 311 are enclosed in a soft iron case or metal shield 700 in order to channel the lines of the magnetic field.

Figure 25:
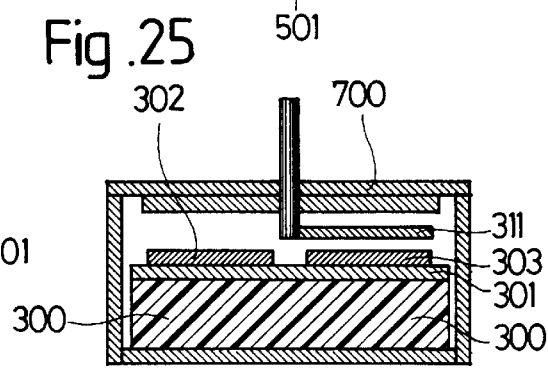

FIG. 25 is an alternative of FIG. 13 wherein the device implanted in integrated circuit 300 is also enclosed in a soft iron frame or metal shield in order to channel the lines of the magnetic field.

Figure 26:
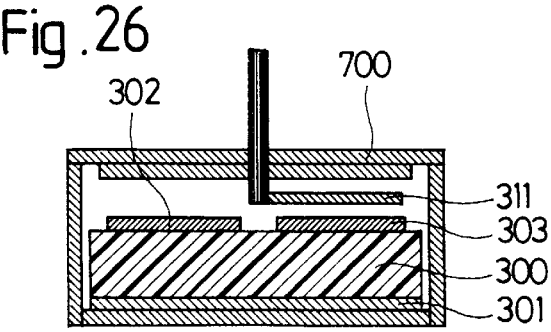

Finally, FIG. 26 shows an alternative of FIG. 15 wherein the device arranged on the integrated circuit 300 (with a primary coil 301 on its lower face and secondary coils 302 and 303 on its upper face) is also enclosed in a soft iron frame or a metal shield 700.

Such magnetic circuits are used to reinforce the picked-up signal with the device according to the invention. The frame is used as protection for the sensor against mechanical interference and electromagnetic noise.

In the series of features of this detection device, it will however be noted that it does not comprise any moving parts. It thus has great resistance to mechanical shocks and vibrations. Moreover, totally integrated embodiments do not require any connecting wire, which reduces stray capacity and improves resistance to ambient electromagnetic noise.

Another advantage is that the sensor part is resistant to strong thermal stress. Moreover, the features of the device according to the invention are independent of temperature.

The measurement provided by the device also has a linear feature. The demodulated signal provides an analogue output whose level varies in proportion to the relative position between a tooth and a notch.

Another important advantage is the great immunity of the device to electric noise. The miniature size of the device limits reception of such noise and the advanced integration prevents the influence of interference prior to the signal processing. The connection of the coils in opposition (see FIG. 10) is particularly advantageous since the noise appearing at a coil is subtracted from the noise appearing at the other coil.

Finally, as shown in FIG. 2, the signal modulation level is hardly influenced by a change in the sensor-moving part distance.

What is claimed is:

1. A device for detecting the position and/or movement of a part able to move with respect to said device, said part comprising at least a zone made of a material capable of influencing a magnetic field, said material being either a magnetic or non-magnetic metallic material, the device comprising a primary coil inducing a magnetic field and a pair of separate secondary coils for receiving the magnetic field, each secondary coil picking up a portion of the magnetic field, the secondary coils being planar, wherein the coils are spaced apart by a pitch and are disposed substantially in a same plane which is substantially parallel to the plane of the part and facing said zone, the secondary coils being disposed according to a differential structure with respect to the primary coil, each secondary coil covering a surface corresponding to a surface of said zone, wherein the part comprises alternating zones of low magnetic permeability and zones of high magnetic permeability, said alternating zones having a pitch substantially corresponding to the pitch of said secondary coils, the lines of the magnetic field being deviated by the presence of a zone of low or high permeability thereby changing the portion of the magnetic field pick up by a secondary coil;

said device further comprising detection circuit means for measuring the difference between the respective portions of the magnetic field picked up by said secondary coils, and for detecting the position, the speed of movement or the direction of movement of the part independently of any variations in the value of said magnetic field and of any variations in distance between said secondary coils and said part.

2. A detection device according to claim 1, wherein the primary coil is supplied with an alternating signal and wherein the detection circuit means measures the amplitude modulation of a signal picked up by a secondary coil, the movement of the part modulating the signal reception.

3. A detection device according to claim 1, wherein the primary coil is supplied with an alternating signal and wherein the detection circuit means measures the phase modulation of a signal picked up by a secondary coil, the movement of the part modulating the signal reception.

4. A detection device according to claim 2, wherein the detection circuit means compares the modulations of the signals picked up by the secondary coils and determines the direction of movement of the part.

5. A detection device according to claim 1, wherein the secondary coils are staggered with respect to each other, parallel to the plane of the part.

6. A detection device according to claim 1, wherein the secondary coils are of dimensions substantially equal to the dimensions of the zones of low and high magnetic permeability.

7. A detection device according to claim 1, wherein the coils are deposited and etched on at least one plate.

8. A detection device according to claim 7, wherein the primary and secondary coils are realised on the surface of an integrated circuit.

9. A detection device according to claim 3, wherein the detection circuit means compares the modulations of the signals picked up by the secondary coils and determines the direction of movement of the part.

10. A detection device according to claim 2, 3, 4 or 9, wherein the detection circuit is realised in the form of an integrated circuit.

11. The detection device according to claim 1, comprising only a single said primary coil, and only a single said pair of secondary coils.

* * * * *

UNITED STATES PATENT AND TRADEMARK OFFICE
CERTIFICATE OF CORRECTION

PATENT NO. : 6,043,644
DATED : March 28, 2000
INVENTOR(S) : Yves de Coulon, et. al.

It is certified that error appears in the above-identified patent and that said Letters Patent is hereby corrected as shown below:

Title page, item [73], Assignee: should read -- Centre Suisse D' Electronique et de Microtechnique SA- Recherche et Developpement, Neuchatel, Switzerland--

Signed and Sealed this

Twenty-fourth Day of October, 2000

Attest:

Q. TODD DICKINSON

*Attesting Officer*        *Director of Patents and Trademarks*